United States Patent [19]

Smith

[11] 4,202,130
[45] May 13, 1980

[54] AMUSEMENT DEVICE

[76] Inventor: Terry G. Smith, 1002 Figuroa St., Folsom, Calif. 95630

[21] Appl. No.: 911,080

[22] Filed: May 31, 1978

[51] Int. Cl.$^2$ ............................................. A63G 31/02
[52] U.S. Cl. ....................................... 46/1 R; 46/228
[58] Field of Search .................. 46/1 R, 1 B, 45, 228, 46/226; 200/61.58 R, 61.58 B

[56] References Cited

U.S. PATENT DOCUMENTS

| | | | |
|---|---|---|---|
| 3,012,368 | 12/1961 | Friedman | 46/226 |
| 3,654,710 | 4/1972 | Barnard | 46/228 X |
| 3,904,841 | 9/1975 | Swatman | 200/61.58 R |

Primary Examiner—Charles E. Phillips
Attorney, Agent, or Firm—Blair, Brown & Kreten

[57] ABSTRACT

An amusement device for young children to be mounted on a safety belt in an automobile designed to occupy the child's attention during automobile trips, the device including knobs to be turned and buttons to be pushed. The device includes lights, and a switch that will permit operation of the lights when the device is properly mounted on the safety belt.

1 Claim, 5 Drawing Figures

AMUSEMENT DEVICE

BACKGROUND OF THE INVENTION
FIELD OF THE INVENTION
SUMMARY OF THE INVENTION

Children in automobiles should be securely fixed in a child's seat with a safety belt to minimize the danger of harm to the child in case of an accident. It is also desirable to provide means to entertain the child to reduce the likelihood of the automobile driver being distracted by the child.

It is an object of the present invention to provide a device which, while entertaining the child by providing knobs to turn and buttons to push, will also provide an instruction "Fasten Seat Belts" which will be illuminated when the device is put in position.

Other objects and advantages will become apparent in the following specification when considered in light of the attached drawings.

DESCRIPTION OF THE PREFERRED EMBODIMENT

Figure 1:
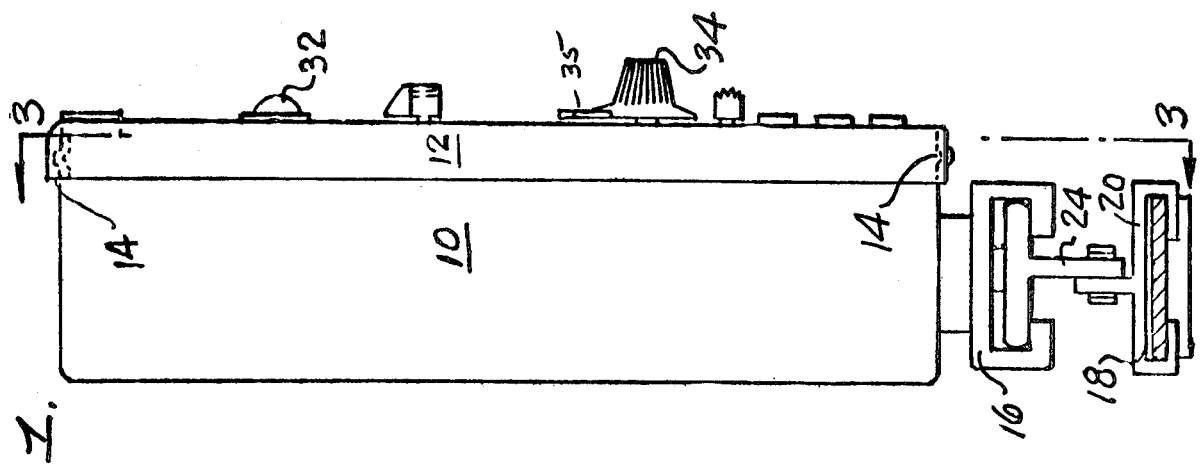
FIG. 1 is a side view of the device.
Figure 2:
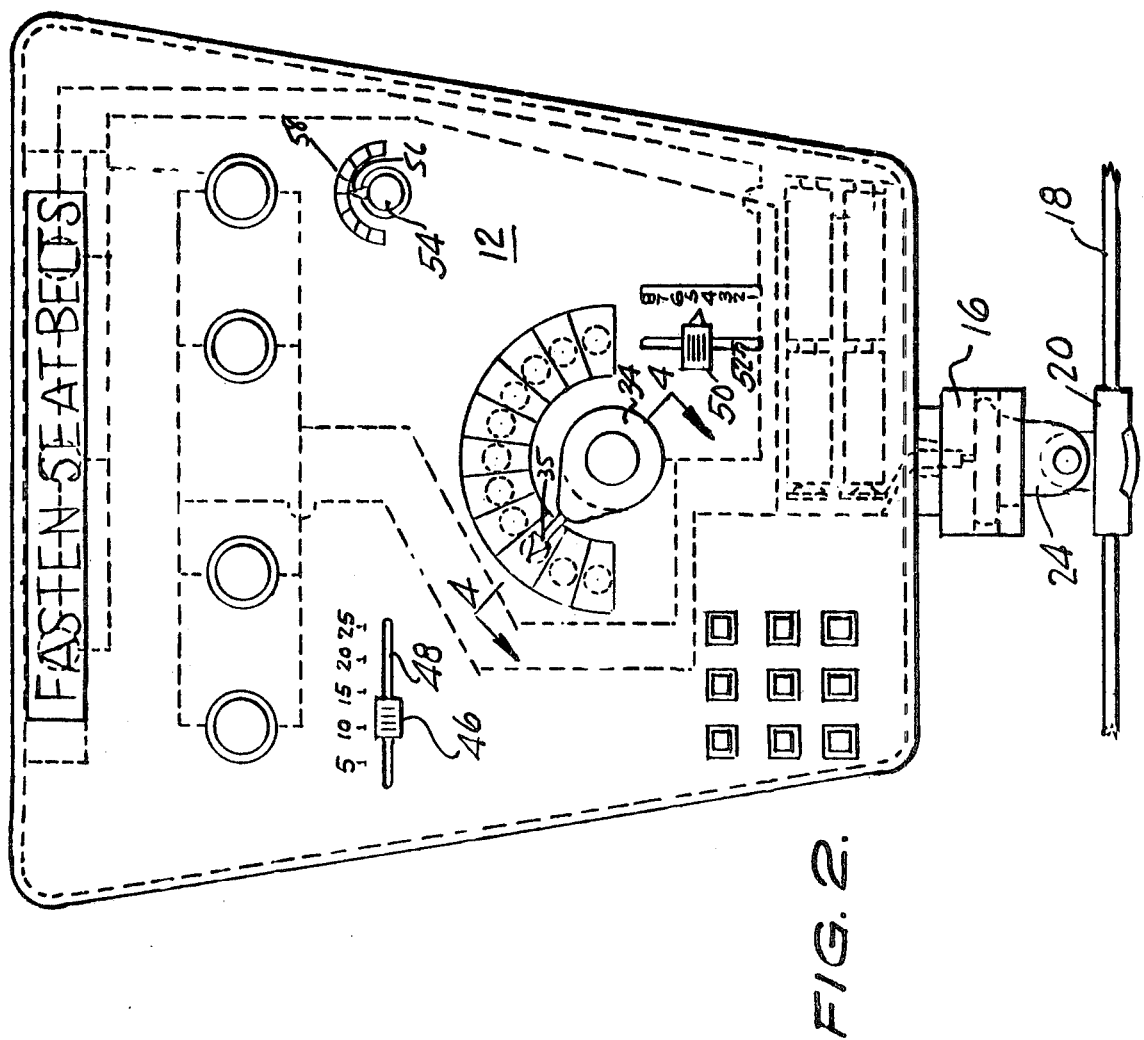
FIG. 2 is a top view of the device.

As seen in FIG. 1 the device comprises a container or box portion 10 on which a cover 12 is secured by means of interlocking detents 14 formed as an outwardly struck projection on the box 10 and a dent in the inner surface of the flange of cover 12.

Figure 5:
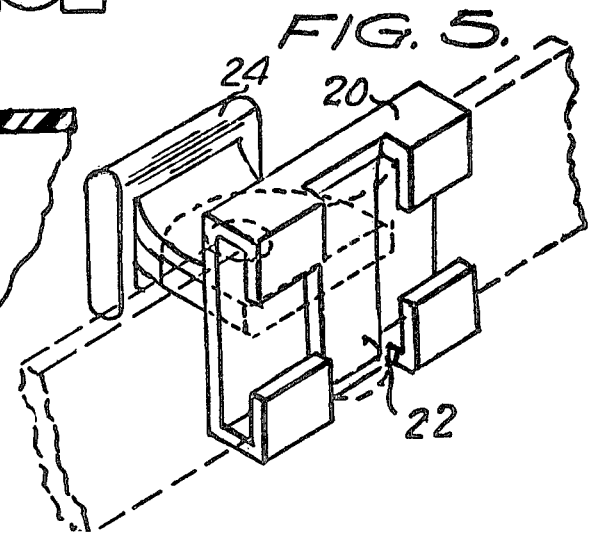
FIG. 5 is a perspective view of the mounting for the device which is shown secured to the seat belt.

The box 10 has on one side a means 16 by which the box is removably secured to the seat belt 18. On seat belt 18 a slidable element 20 is mounted. This element, as shown in FIG. 5, has a projection 22 that will make movement of element 20 along the seat belt difficult except when the seat belt is not in use. An element 24 is pivotally mounted on element 20 so that some movement of box 10 with respect to belt 18 is permitted.

Figure 3:
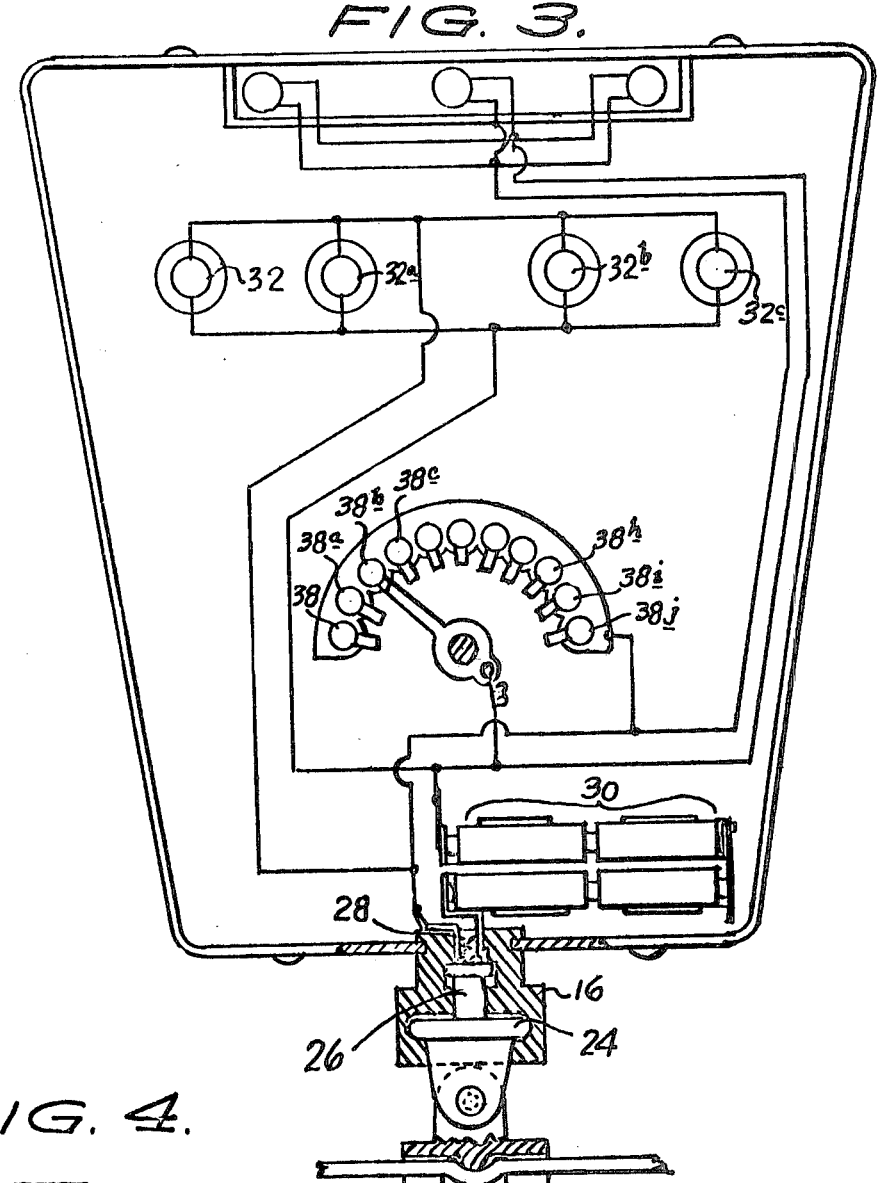
FIG. 3 is an interior view showing the wiring with the means to attach the device to the seat belt in section.

Referring now to FIG. 3 it is seen that when the element 16 is in place on element 24 to hold the device in position in front of a child about whom the belt is secured, the element 24 presses a switch button 26 which actuates switch 28 to activate an electric circuit within the box as will be explained later.

As seen in FIG. 1 the surface of lid 12 of box 10 is provided with a sign at the top, "Fasten Seat Belts". The child seeing this sign illuminated each time he is secured by the seat belt will become conscious of the meaning, and hopefully, of the importance of his seat belt.

From switch 28, as seen in FIG. 3, one lead contacts a bank of small batteries 30 and the other lead is connected to one terminal of lights to illuminate the "Fasten Seat Belt" sign, thence back to batteries 30, and also to a plurality of colored lights 32, 32a, 32b, 32c and also thence back to batteries 30. The sign "Fasten Seat Belts" and lights 32, 32a, 32b, and 32c will, therefore, all be lit up on mounting element 16 on element 24.

A knob 34 is also mounted on the top of cover 12 in a position to be easily reached by the child. This knob 34 is fixed to a rotatable shaft 36 extending to the bottom of box 10 where it is secured for rotation but not for axial movement.

In an arc in front of, or beyond knob 34 from the position of the child, are a plurality of lights 38, 38a, 38b, etc. A pointer 35 mounted to rotate with knob 34 will point to successive lights 38, 38a etc. as knob 34 is turned by the child.

Figure 4:
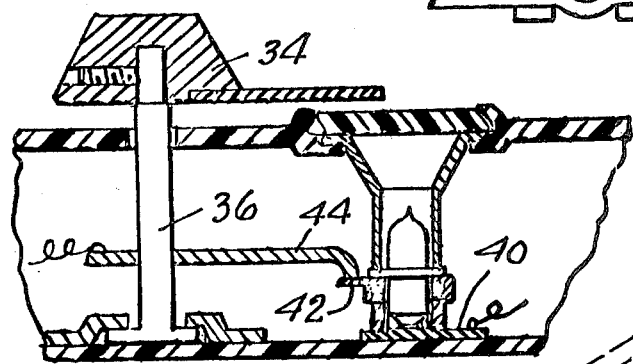
FIG. 4 is a fragmentary section taken on line 4—4 of FIG. 2.

A lead from batteries 30 is connected to an arcuate metal plate 40 as seen in FIG. 4 forming one contact of each socket for each of the lights 38, 38a, 38b etc. The other contact for these lights is provided by a metal projection 42 on each socket.

A contact 44 is permanently mounted on shaft 36. One lead from batteries 30 is connected to contact 44. Contact 44 is bent downward at its end so that it will successively contact the metal projection of the lights 38, 38a, etc. when knob 34 is turned back and forth by the child so the lights may be changed at will by the child.

There are also provided slides 46 and 50 slidable in slots 48 and 52 respectively. Numbers or other indicia may be arranged along slots 48 and 52 to indicate the position of the slides 46 and 50.

Similarly there is a knob 54 carrying a pointer 56 to point to indicia 58 on the surface of box cover 12.

In the lower lefthand portion of box cover 12 are nine buttons similar to the buttons on a "touch tone" telephone. These buttons are not connected to anything but, like slides 46 and 50, and knob 54, they provide entertainment for the child who will have watched his mother dialing on the phone or adjusting a radio.

Having thus described the preferred embodiment of the invention it should be understood that numerous structural modifications and adaptations may be resorted to without departing from the spirit of the invention.

What is claimed is:

1. An amusement and safety device for detachable connection to an automobile safety belt for children riding in an automobile comprising a box, means secured to the safety belt for said child, means including a switch on said box to demountably engage said means secured to the safety belt, whereby said switch will be actuated by said engagement, said box containing electric batteries and circuitry including lights, said circuitry including said switch means, and an electric sign on said box illuminated by some of said lights when said switch is engaged, the surface of said box being provided with push buttons and a rotatable knob, and switch means operated by said rotatable knob to connect selected lights to said circuitry whereby the child may be amused by rotating said knob.

* * * * *